United States Patent [19]

Yoshida et al.

[11] Patent Number: 4,513,570

[45] Date of Patent: Apr. 30, 1985

[54] MANUAL RESET TYPE BIMETAL THERMOSTAT

[75] Inventors: Yasuhisa Yoshida; Toshio Ohi, both of Tokyo, Japan

[73] Assignee: Nippon GT Corporation, Tokyo, Japan

[21] Appl. No.: 487,931

[22] Filed: Apr. 25, 1983

[51] Int. Cl.³ .................................................. F03G 7/06

[52] U.S. Cl. .................................. 60/529; 236/101 R; 337/348

[58] Field of Search .......................... 60/527, 528, 529; 236/94, 101 R; 337/334, 348, 358, 367

[56] References Cited

U.S. PATENT DOCUMENTS 2,434,984 1/1948 Bolesky et al. ...................... 337/367

4,117,443 9/1978 Hofsäss ........................... 337/367 X

*Primary Examiner*—Stephen F. Husar

*Attorney, Agent, or Firm*—Michael F. Petock

[57] ABSTRACT

Disclosed is a manual reset type bimetal thermostat where a reversible plate is affixed to a disc type bimetal which can reverse in response to temperature change, characterized in that at least either of the reversible plate and the bimetal is provided with an air passage hole.

5 Claims, 4 Drawing Figures

MANUAL RESET TYPE BIMETAL THERMOSTAT

The present invention relates to a manual reset type bimetal thermostat in which a reversible plate is affixed to a disc type bimetal.

This manual reset type bimetal thermostat comprises a disc type bimetal which can reverse its warping direction in response to temperature change and a reversible plate which has the same shape as the bimetal and is affixed to it, and the reversible plate is reversed by a reversal strength of the bimetal reversed in response to temperature change in order to thereby open or close switch contacts adjacent to the bimetal. Reset operation of the opened or closed switch contacts is carried out by returning manually the reversible plate to its original normal position. Such a manual reset type bimetal thermostat is known and is disclosed, for example, in Japanese Utility Model Provisional Publication No. 26836/1981.

The aforesaid manual reset type bimetal thermostat is reversed in its warping direction in response to temperature rise in order to press down a contact spring, for example, via a pin by its contact with the surface of the reversed bimetal, whereby a movable electrical contact is opened. In this case, the above pin is adapted to move down by the bimetal with the interposition of the reversible plate.

Afterward, even when the disc bimetal is returned to its original normal position in response to temperature drop, the reversible plate still remains in the reversing state. Therefore, the opening condition of the switch is maintained so long as the reversible plate is not pressed back by hand.

However, when the disc bimetal is returned to the normal position, the reversible plate is disadvantageously often returned automatically together with it. This cause would be that at the time of the rapid return reversal of the bimetal, negative pressure occurs in the space between the bimetal and the reversible plate, and as a result the reversible plate is attracted by the disc bimetal and accompanies it at its return movement.

An object of the present invention is thus to provide a bimetal thermostat in which a reversible plate brings about no return reversal at the time of the return reversal of a disc bimetal and maintains its reversing configuration until returned by hand.

That is to say, the present invention is directed to a manual reset type bimetal thermostat where a reversible plate is affixed to a disc type bimetal which can reverse in response to temperature change, characterized in that at least either of the reversible plate and the bimetal is provided with an air passage hole.

Figure 1:
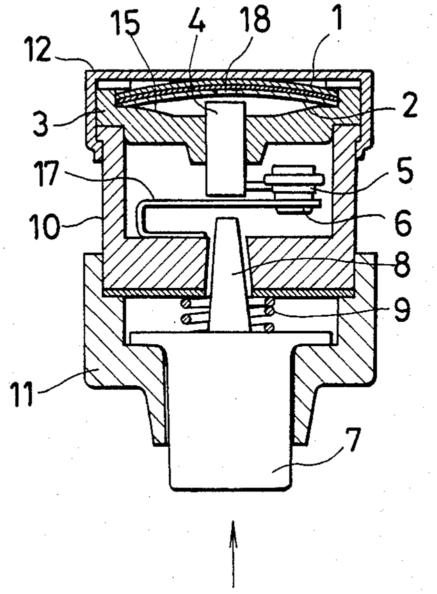
Figure 2:
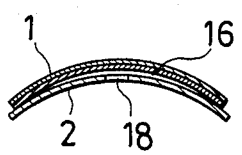
Figure 3:
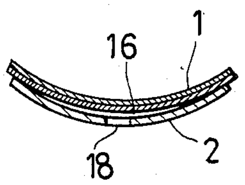
Figure 4:
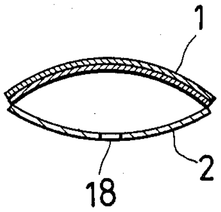

The aforementioned object and features as well as benefits of the present invention will be understood from the following detailed description and the accompanying drawings, in which:

FIG. 1 is a cross-sectional view illustrating one embodiment of a manual reset type bimetal thermostat according to the present invention;

FIGS. 2 to 4 are sectional views explaining the successive behavior of a bimetal and a reversible plate in the same embodiment; FIG. 2 is a sectional view illustrating a normal and non-active condition of the bimetal and the reversible plate; FIG. 3 is a sectional view illustrating a reversed bimetal and reversible plate; and FIG. 4 is a sectional view in which the bimetal alone is returned to its original normal position.

Referring now to FIG. 1, reference numeral 1 represents a bimetal operatable in response to heat which comprises an upside member of a low expansion and a downside member of a high expantion. Numeral 2 is a reversible plate affixed to the bimetal 1 and having the same shape as it, 3 is a retainer, 4 is a pin which is movably retained by means of the retainer 3, 5 is a stationary contact, 6 is a movable contact, 7 is a push button, 8 is a reset bar connected to the push button 7, 9 is a spring for urging always the push button 7 outward, 10 is a main body, 11 is a button holder for slidably holding the push button 7, and 12 is a cap.

The bimetal 1 and the reversible plate 2 are received, at the ends thereof, in a circular recess formed at an upper portion of the retainer 3, and in this case, peripheries of the bimetal 1 and the reversible plate 2 are not restrained mutually, but accommodated therein in a free condition. Further, between both the members above, there is defined a suitable space 16 while they take reversing condition and non-reversing, i.e. normal condition. This space 16 is preferably about 8% or less in thickness in section with respect to a diameter value of the bimetal 1 or the reversible plate 2. That is to say, the space 16 is 1 mm or less in thickness in the case that the bimetal 1 is 0.5 inch in diameter, and is 2 mm or less in thickness when it is 1 inch in diameter. If the space 16 has a more volume than indicated above, a problem regarding the reversal function will occur. The reversible plate 2 is made of a metal in iron series or copper series, or a material having quality similar to it. Further, the reversible plate 2 is prepared in the form of an elastic plate having such a function as to be easily reversed in the same direction as the bimetal 1 by a reversal strength generated from the reversal of the bimetal 1 on the basis of temperature change. For achievement of such a function, supposing the bimetal 1 and the reversible plate 2 both are made of a similar material having equal elasticity, a thinner plate material is employed for the reversible plate 2. Furthermore, the reversible plate 2, when reversed, is required to have a strength enough to maintain its reversing condition against the restoring force of a movable member 17 for supporting the movable contact 6. Moreover, the reversible plate 2 is provided, at the center thereof, with a through air passage hole 18, and a surface area of the air passage hole 18 (i.e., area which the hole occupies on the surface of the reversible plate 2) is set to within 25% of the surface area of the reversible plate 2. Even if the surface area of the air passage hole 18 is greater than the indicated range, functional effect of releasing the negative pressure generated in the space 16 therebetween is scarcely different from that of the case the area is in an indicated range. Further, if the surface area is greater than given above, a smooth reversal function of the reversible plate 2 will be hindered. The reason why the air passage hole 18 is formed at a substantially central position of the reversible plate 2 is that a displacement by the reversal is largest there and a volume of the space 16 at the central position is greatest as compared with other positions therearound, so that the most effect aimed is easy to obtain. The air passage hole 18 may be perforated in the bimetal 1, and may be provided on both the bimetal 1 and the reversible plate 2. Further, a plurality of the air passage holes may be formed there.

FIG. 1 exhibits the bimetal thermostat at a lower temperature than a temperature level at which it operates, and at this point of time the bimetal 1 is nonactive and the respective contacts 5 and 6 are in contact with each other in an ON state.

Now, when temperature rises and reaches a predetermined level, the bimetal 1 reverses and presses the reversible plate 2, so that it changes from the configuration shown in FIG. 1 to another of FIG. 3. At this time, the pin 4 pushes down the movable member 17 in order to separate the movable contact 6 from the stationary contact 5, whereby the thermostat becomes an OFF state.

Then, when temperature drops gradually and reaches a level at which the bimetal is to be reset, the bimetal 1 alone is returned to its original position but the reversible plate 2 retains in the reversing style. This constitution is shown in FIG. 4. It should be noted that the reversible plate 2 is provided with the air passage hole 18 and the suitable space 16 is defined between the bimetal 1 and the reversible plate 2, therefore when the bimetal 1 is only returned rapidly, air is inhaled promptly through the space 16 and thus no negative pressure is generated there. In consequence, the reversible plate 2 can retain the reversing configuration without following the return of bimetal 1.

The reset of the switch can be accomplished by pressing the push button 7 in an arrow direction by hand in order to return forcedly the reversible plate 2 to the original normal position, as shown in FIG. 2, via the reset bar 8, the movable member 17 and the pin 4.

As seen from the foregoing, according to the present invention, at least either of the reversible plate and the bimetal in the manual reset type bimetal thermostat is provided with an air passage hole, therefore the back reversal of the reversible plate can be prevented at the time of the reset return of the bimetal, and a smooth return operation of the bimetal can be obtained. Accordingly, the reversible plate can surely maintain the reversing condition until the reset operation is given by hand. In consequence, the present invention can make it possible to provide a reliable manual reset type bimetal thermostat which can work without fail.

We claim:

1. A manual reset type bimetal thermostat where a reversible plate is substantially contiguous with a disc type bimetal which can reverse in response to temperature change, characterized in that at least either of said reversible plate and said bimetal is provided with an air passage hole, said air passage hole being substantially free from solid structure in said thermostat.

2. A manual reset type bimetal thermostat according to claim 1 wherein an area of said air passage hole is within 25% of a surface area of said reversible plate.

3. A manual reset type bimetal thermostat according to claim 1 wherein said air passage hole is formed at a substantially center of said bimetal or said reversible plate.

4. A manual reset type bimetal thermostat according to claim 1 wherein a suitable space is defined between said bimetal and said reversible plate while they take non-reversing and reversing conditions.

5. A manual reset type bimetal thermostat according to claim 4 wherein the thickness in section of said space is 8% or less of the diameter of the reversible plate or the bimetal when both the reversible plate and the bimetal take the reversing condition or the non-reversing condition.

* * * * *